United States Patent [19]
Lednicer

[11] 3,879,400
[45] Apr. 22, 1975

[54] 1-LOWER ALKYL-(1-ADAMANTYLMETHYL)PIPERIDINES AND PROCESS FOR THEIR PREPARATION

[75] Inventor: Daniel Lednicer, Portage, Mich.

[73] Assignee: The Upjohn Company, Kalamazoo, Mich.

[22] Filed: Nov. 16, 1973

[21] Appl. No.: 416,403

[52] U.S. Cl............................. 260/293.56; 424/267
[51] Int. Cl............................................ C07d 29/10
[58] Field of Search ............................... 260/293.56

[56]  References Cited
       UNITED STATES PATENTS

| | | | |
|---|---|---|---|
| 3,352,912 | 11/1967 | Prichard | 260/563 |
| 3,532,748 | 10/1970 | Smith | 260/563 |
| 3,624,126 | 11/1971 | Narayanan | 260/468 B |
| 3,810,884 | 5/1974 | Gold | 260/239 A |

*Primary Examiner*—G. Thomas Todd
*Attorney, Agent, or Firm*—Willard L. Cheesman

[57]  ABSTRACT

Compounds of the formula:

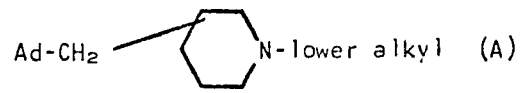

where Ad is an adamantyl radical attached at a bridgehead carbon can be made by reacting adamantyl carbonitrile with 2-, 3-, and 4- halopyridine, followed by N-alkylation and reduction. They have hypolipidemic and antiatherosclerotic properties, and are useful in that field.

8 Claims, No Drawings

1-LOWER ALKYL-(1-ADAMANTYLMETHYL)PIPERIDINES AND PROCESS FOR THEIR PREPARATION

BRIEF SUMMARY OF THE INVENTION

The compounds of this invention are useful as hypolipidemic agents, particularly hypocholesteremic and are useful in the treatment of serum lipid disorders and other disorders of lipid metabolism including the various types of hyperlipoproteinemia and other hyperlipidemias. The route of administration is preferably oral, and the usual oral modes of administration and dosage forms are used.

The compounds A of this invention can be prepared for administration to patients in unit dosage form such as tablets, capsules, pills, powders, granules, oral solutions or suspensions, and oil-in-water and water-in-oil emulsions containing suitable quanities of A.

For oral administration either solid or fluid unit dosage forms can be prepared. For preparing solid compositions such as tablets, A is mixed with conventional ingredients such as talc, magnesium stearate, dicalcium phosphate, magnesium aluminum silicate, calcium sulfate, starch, lactose, acacia, methylcellulose, and functionally similar materials as pharmaceutical diluents or carriers. Capsules are prepared by mixing the compound with an inert pharmaceutical diluent and filling the mixture into a hard gelatin capsule of appropriate size. Soft gelatin capsules are prepared by machine encapsulation of a slurry of the compound with an acceptable vegetable oil, light liquid petroleum or other inert oil.

Fluid unit dosage forms for oral administration such as syrups, elixirs, and suspensions can be prepared. The water-soluble forms can be dissolved in water together with sweetening agents, flavoring agents, and a sugar, with preservatives, to form a syrup. The elixirs can be prepared using an aqueous alcoholic vehicle such as aqueous ethanol with suitable sweeteners such as sugar and saccharin, together with an aromatic flavoring agent. Suspensions can be prepared with a syrup vehicle with the aid of a suspending agent such as acacia, tragacanth, methylcellulose and the like. Adult human daily dosage is in the range of 0.1 g. to 10 g.

The compounds of this invention have the formula:

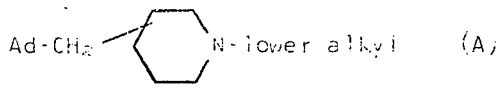

In which Ad is an adamantyl radical attached at a bridgehead carbon.

The general methods of synthesizing the compounds of this invention are represented by the following synthesis steps.

The compounds of this invention can be prepared from 2-, 3-, and 4- halo-pyridine and adamantane carbonitrile, employing the lithium reactant of the former to give the corresponding ketone.

A reduction of the ketone such as Wolff-Kishner proceeds smoothly. The solubility of the product in hot ethylene glycol can be advantageously employed to preclude loss as an azeotrope.

Each resulting amine can then be quaternized with lower alkyl halide and the resulting salts catalytically reduced to produce A.

The reactions can be shown as follows:

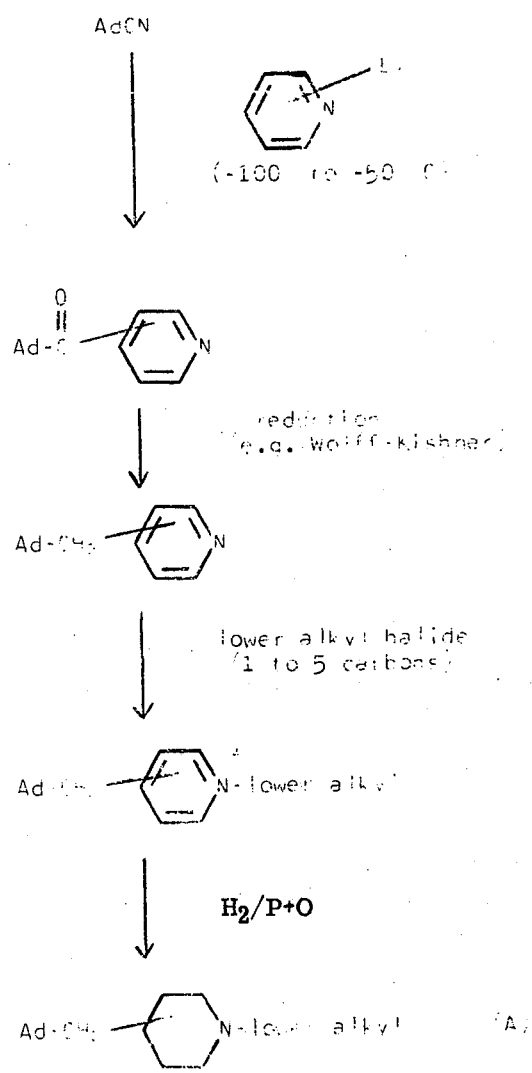

DETAILED DESCRIPTION OF THE INVENTION

The following examples constitute specific embodiments of the invention. In the examples a variety of conventional abbreviations are used. All such expressions are believed to be known to those skilled in the art. The expression "SSB" refers to Skellysolve B, a commercial mixture of hexane hydrocarbons. "TLC" means thin layer chromatography. "THF" means tetrahydrofuran.

EXAMPLE 1

Adamantyl 2-Pyridyl Ketone

To a solution of 4.94 g. of 2-bromopyridine in 50 ml. THF cooled to −78° there was added over 10 minutes 18.8 ml. 1.64N BuLi. There was then added 5.0 g. (0.031 mole) of adamantyl carbonitrile in 50 ml. THF. The mixture was stirred in the cold for 2 hours and at room temperature overnight. Following 1 hour stirring with 100 ml. 2.5N HCl, the mixture was made strongly basic and extracted with $C_6H_6:Et_2O$. The extract was washed with $H_2O$ and brine and taken to dryness. The residue was chromatographed on 600 ml. silica gel (elution with $CH_2Cl_2$). Those fractions which were similar by TLC were combined and recrystallized from SSB, to afford 5.48 g. (73%) of adamantyl 2-pyridyl ketone, m.p. 120°–121°, m/e 241.

Anal. Calcd for $C_{16}H_{19}NO$: C, 79.63; H, 7.94; N, 5.81.
Found: C, 79.61; H, 7.91; N, 6.08.

EXAMPLE 2

Adamantyl 3-Pyridyl Ketone

To a solution of 3.95 g. of 3-bromopyridine in 50 ml. THF cooled to −78° there was added over 12 minutes 15 ml. 1.64N BuLi. There was then added 4.0 g. (0.025 mole) of the nitrile in 40 ml. THF. The mixture was stirred at −78° for 2 hours, at 0° for 3 hours and then overnight at room temperature. Following 2 hours stirring with 100 ml. 2.5N HCl, the aqueous layer was separated (The organic layer afforded 1.90 g. of recovered nitrile.). The organic layer was washed twice more with 2.5N HCl. The combined aqueous fractions were made strongly basic and extracted with $Et_2O:C_6H_6$. The residue which remained when this last was taken to dryness was chromatographed on 400 ml. Florisil (elution with 5% $Me_2CO:SSB$). The solid fractions were combined and recrystallized from SSB. There was obtained 2.60 g. (83%) of adamantyl 3-pyridyl ketone, m.p. 72°–74°; m/e 241.

Anal. Calcd for $C_{16}H_{19}NO$: C, 79.63; H, 7.94; N, 5.81.
Found: C, 80.03; H, 8.18; N, 5.82.

EXAMPLE 3

Adamantyl 4-Pyridyl Ketone

To a solution of 4.94 g. of 4-bromopyridine in 50 ml. THF cooled to −78° there was added over 20 minutes 18.8 ml. 1.64N BuLi. There was then added 5.0 g. (0.031 mole) of nitrile in 50 ml. THF. The mixture was stirred at −78° for 2 hours, at 0° for 3.5 hours and overnight at room temperature. Following 1.5 hours stirring with 100 ml. 2.5N HCl and 50 ml. $H_2O$ the aqueous layer was separated. The organic layer was washed with $H_2O$ until clear. The combined aqueous fractions were than made strongly basic and extracted with $CH_2CL_2$. The residue which remained when this last was taken to dryness was chromatographed on 500 ml. Florisil (elution with 10% $Me_2CO:SSB$). The solid fractions were combined and recrystallized from $Me_2CO:SSB$. There was obtained 3.43 g. (46%) of adamantyl 4-pyridyl ketone, m.p. 112°–113.5°.

Anal. Calcd for $C_{16}H_{19}NO$: C, 79.63; H, 7.94; N, 5.81.
Found: C, 80.05; H, 8.09; N, 5.81.

EXAMPLE 4

2-(1-Adamantylmethyl)pyridine Hydrochloride

A mixture of 5.48 g. (0.023 mole) of adamantyl 2-pyridyl ketone, 3.05 ml. $N_2H_4.H_2O$, and 4.41 g. KOH in 60 ml. ethylene glycol was heated at reflux for 1.5 hours, distillate was then removed so as to bring the pot temperature to 200°. Following an additional 5 hours heating, the mixture was allowed to cool and diluted with $H_2O$. The precipitate was taken into $Et_2O$; this solution was washed with $H_2O$ and brine and taken to dryness. The residual gum was dissolved in $Et_2O$ and treated with HCl in $Et_2O$. The precipitated solid was recrystallized from $CH_2Cl_2:EtOAc$ to afford 5.01 g. (83%) of 2-(1-adamantylmethyl)pyridine hydrochloride, m.p. 217°–220°.

Anal. Calcd for $C_{16}H_{22}ClN$: C, 72.84; H, 8.41; N, 5.31.
Found: C, 72.04; H, 8.46; N, 5.42.

EXAMPLE 5

3-(1-Adamantylmethyl)pyridine

A mixture of 4.36 g. (0.018 mole) of adamantyl 3-pyridyl ketone, 2.45 ml. $N_2H_4.H_2O$, and 3.51 g. KOH in 45 ml. ethylene glycol was heated at reflux for 2 hours. Distillate was then collected so as to bring the pot temperature to 200°. Following an additional 6 hours heating at reflux, the mixture was allowed to cool and diluted with $H_2O$. The precipitated solid was chromatographed on 1 L Florisil (elution with 5% $Me_2CO:SSB$). The solid fractions were combined and recrystallized from $MeOH:H_2O$. There was obtained 3.40 g. (83%) of 3-(1-adamantylmethyl)pyridine, m.p. 57°–59°.

Anal. Calcd for $C_{16}H_{21}N$: C, 84.53; H, 9.31; N, 6.16.
Found: C, 84.64; H, 9.39; N, 6.22.

EXAMPLE 6

4(1-Adamantylmethyl)pyridine

A mixture of 3.43 g. (0.014 g) of adamantyl 4-pyridyl ketone, 1.93 ml. $N_2H_4.H_2O$, and 2.76 g. KOH in 35 ml. ethylene glycol was heated at reflux 2 hours. Distillate was then removed to bring the pot temperature to 200°. At the end of an additional 8 hours heating, the mixture was allowed to cool, diluted with $H_2O$ and extracted with $Et_2O$. The residue which was obtained when the organic layer was taken to dryness was chromatographed on 400 ml. Florisil (elution with 5% $Me_2CO$ in SSB). The initial crystalline fractions were combined and recrystallized from $MeOH:H_2O$. There was obtained 2.26 g. (70% of 4(1-adamantylmethyl)pyridine, m.p. 189°–190°.

Anal. Calcd for $C_{16}H_{21}N$: C, 84.53; H, 9.31; N, 6.16.
Found: C, 84.29; H, 9.45; N, 6.53.

EXAMPLE 7

2-(1-Adamantylmethyl)pyridine Methiode

To a solution of 2-(1-adamantylmethyl)pyridine free base from 5.01 (0.019 mole) of the hydrochloride in 40 ml. $CH_3CN$ there was added 5 ml. $CH_3I$. At the end of 6 hours the mixture was diluted with $Et_2O$ to 400 ml.

The precipitated solid was recrystallized from MeOH:EtOAc to give 5.18 g. (75%) of quaternary salt, 2-(1-Adamantylmethyl)pyridine Methiode m.p. 190°–193°.

Anal. Calcd for C₁₇H₂₄NI: C, 55.28; H, 6.55; N, 3.79.
Found: C, 55.16; H, 6.55; N, 4.07.

EXAMPLE 8

3-(1-Adamantylmethyl)pyridine Methioode

Methyl iodide, (3.4 ml.) was added to a solution of 3.4 g. (0.015 mole) of 3-(1-adamantylmethyl)pyridine in 25 ml. CH₃CN. At the end of 7.5 hours the mixture was diluted with Et₂O. The precipitated solid was recrystallized from MeOH:EtOAc to give 5.17 g. (95%) of quaternary salt, 3-(1-adamantylmethyl)pyridine methiode m.p. 212°–213°.

Anal. Calcd for C₁₇H₂₄IN: C, 55.28; H, 6.55; N, 3.79.
Found: C, 55.38; H, 6.69; N, 3.86.

EXAMPLE 9

4-(1-Adamantylmethyl)pyridine Methiode

A suspension of 2.0 g. (0.0088 mole) of 4(1-adamantylmethyl)pyridine in 15 ml. CH₃CN containing 2 ml. CH₃I was stirred at room temperature. The solid went into solution as a new solid precipitated. At the end of 6 hours the mixture was diluted with Et₂O. The precipitated solid was recrystallized from MeOH:EtOAc to give 3.10 g. (99%) of quaternary salt, 4-(1-adamantylmethyl)pyridine methiode m.p. 208°–211°.

Anal. Calcd for C₁₇H₂₄IN: C, 55.28; H, 6.55; N, 3.79.
Found: C, 55.07; H, 6.63; N, 3.84.

EXAMPLE 10

1-Methyl-2-(1-adamantylmethyl)piperidine Hydroiodide

A mixture of 4.68 g. (0.0129 mole) of 2-(1-adamantylmethyl)pyridine methiode and 0.80 g. of platinum oxide in 150 ml. EtOH was shaken under H₂ until the theoretical gas uptake was observed (20 minutes). The catalyst was collected on a filter and the filtrate taken to dryness. The residual solid was recrystallized from CH₂Cl₂:EtOAc to give 3.67 g. (78%) of 1-methyl-2-(1-adamantylmethyl)piperidine hydroiodide, m.p. 215°–218°; m/e 247.

Anal. Calcd for C₁₇H₃₀IN: C, 54.40; H, 8.06; N, 3.73.
Found: C, 54.48; H, 8.37; N, 3.86.

EXAMPLE 11

1-Methyl-3-(1-adamantylmethyl)piperidine Hydroiodide

A mixture of 4.67 g. (0.0129 mole) of 3-(1-adamantylmethyl)pyridine methiode and 0.80 g. platinum oxide in 150 EtOH was shaken under H₂ until the theoretical gas uptake was observed (30 minutes). The catalyst was collected on a filter and the filtrate taken to dryness. The residue was recrystallized from CH₂Cl₂:EtOAc to afford 3.94 g. (84%) of 1-methyl-3-(1-adamantylmethyl)piperidine hydroiodide, m.p. 235°–236°.

Anal. Calcd for C₁₇H₃₀IN: C, 54.40; H, 8.06; N, 3.73.
Found: C, 54.32; H, 8.05; N, 3.85.

EXAMPLE 12

1-Methyl-4-(1-adamantylmethyl)piperidine Hydroiodide

A mixture of 2.90 g. (0.0080 mole) of 4-(1-adamantylmethyl)pyridine Methiode and 0.50 g. platinum oxide in 150 ml. EtOH was shaken under H₂ until the theoretical gas uptake was observed (40 minutes). The catalyst was collected on a filter and the filtrate taken to dryness. The residue was recrystallized from CH₂Cl₂:EtOAc to give 2.30 g. (79%) of 1-methyl-4-(1-adamantylmethyl)piperidine hydroiodide, m.p. 278°–279°.

Anal. Calcd for C₁₇H₃₀IN: C, 54.40; H, 8.06; N, 3.73.
Found: C, 54.36; H, 8.01; N, 3.90.

I claim:
1. A compound of the formula

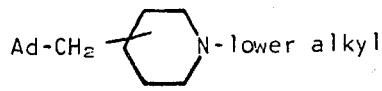

in which Ad is an adamantyl radical attached at a bridgehead carbon.

2. A compound according to claim 1, 1-methyl-2-(1-adamantylmethyl)piperidine hydroiodide.

3. A compound according to claim 1, 1-methyl-3-(1-adamantylmethyl)piperidine hydroiodide.

4. A compound according to claim 1, 1-methyl-4-(1-adamantylmethyl)piperidine hydroiodide.

5. The process for producing 1-lower alkyl-(1-adamantylmethyl)piperidine which comprises reacting pyridyl lithium with adamantyl carbonitrile at a temperature in the range of −100° to −50° C. to form adamantyl pyridyl ketone, subjecting the latter to reduction to produce (1-adamantylmethyl)pyridine, reacting the latter with a lower alkyl halide to produce (1-adamantylmethyl)pyridine alkyl halide and reducing the latter to produce 1-lower alkyl (1-adamantylmethyl)piperidine.

6. The process of claim 5 wherein the starting pyridyl compound is 2-pyridyl lithium and the final product is 1-methyl-2-(1-adamanty(methyl)piperidine.

7. The process of claim 5 wherein the starting pyridyl compound is 3-pyridyl lithium and the final product is 1-methyl-3-(1-adamantylmethyl)piperidine.

8. The process of claim 5 wherein the starting pyridyl compound is 4-pyridyl lithium and the final product is 1-methyl-4-(1-adamantylmethyl)piperidine.

* * * * *